(12) United States Patent
Telian

(10) Patent No.: US 11,892,197 B2
(45) Date of Patent: Feb. 6, 2024

(54) CONDENSING BOILER CONDENSATE DISCHARGE DEVICE

(71) Applicant: Hoval Aktiengesellschaft, Vaduz (LI)

(72) Inventor: Markus Walter Telian, Hörbranz (AT)

(73) Assignee: Hoval Aktiengesellsch aft, Vaduz (LI)

( * ) Notice: Subject to any disclaimer, the term of this patent is extended or adjusted under 35 U.S.C. 154(b) by 150 days.

(21) Appl. No.: 17/672,803

(22) Filed: Feb. 16, 2022

(65) Prior Publication Data

US 2022/0268485 A1 Aug. 25, 2022

(30) Foreign Application Priority Data

Feb. 19, 2021 (EP) ..................................... 21158144

(51) Int. Cl.
*F24H 8/00* (2022.01)

(52) U.S. Cl.
CPC ..................................... *F24H 8/006* (2013.01)

(58) Field of Classification Search
CPC .... F24H 8/006; F24H 9/16; F24H 9/17; F28F 17/005; F24F 13/222
See application file for complete search history.

(56) References Cited

U.S. PATENT DOCUMENTS 6,442,955 B1 * 9/2002 Oakner .................. H01H 36/02
340/618

FOREIGN PATENT DOCUMENTS

| CH | 373714 A | * | 8/1959 |
|----|----------|---|--------|
| CH | 373 714 | | 11/1963 |
| DE | 11 02 659 | | 3/1961 |
| DE | 10 2006 041595 | | 3/2007 |
| EP | 0 404 736 | | 12/1990 |

OTHER PUBLICATIONS

EP Search Report filed in EP 21 15 8144 dated Aug. 12, 2021.

* cited by examiner

*Primary Examiner* — Ko-Wei Lin
(74) *Attorney, Agent, or Firm* — Rankin, Hill & Clark LLP

(57) ABSTRACT

A condensing boiler condensate discharge device includes a hollow body having a peripheral wall, a first longitudinal end and a second longitudinal end. An inflow opening is provided in the peripheral wall and extends starting from the first longitudinal end in the direction of the second longitudinal end. A drain opening is provided in the peripheral wall. A separating wall is provided within the hollow body and extends from the first longitudinal end in the direction of the second longitudinal end and has a free end. The separating wall divides the hollow body into a condensate receiving channel, and a condensate discharge channel. The condensate receiving channel and the condensate discharge channel are flow-connected to each other via a passage. The drain opening and the inflow opening are arranged to be overlapping with an overlap length as viewed in the longitudinal direction.

20 Claims, 3 Drawing Sheets

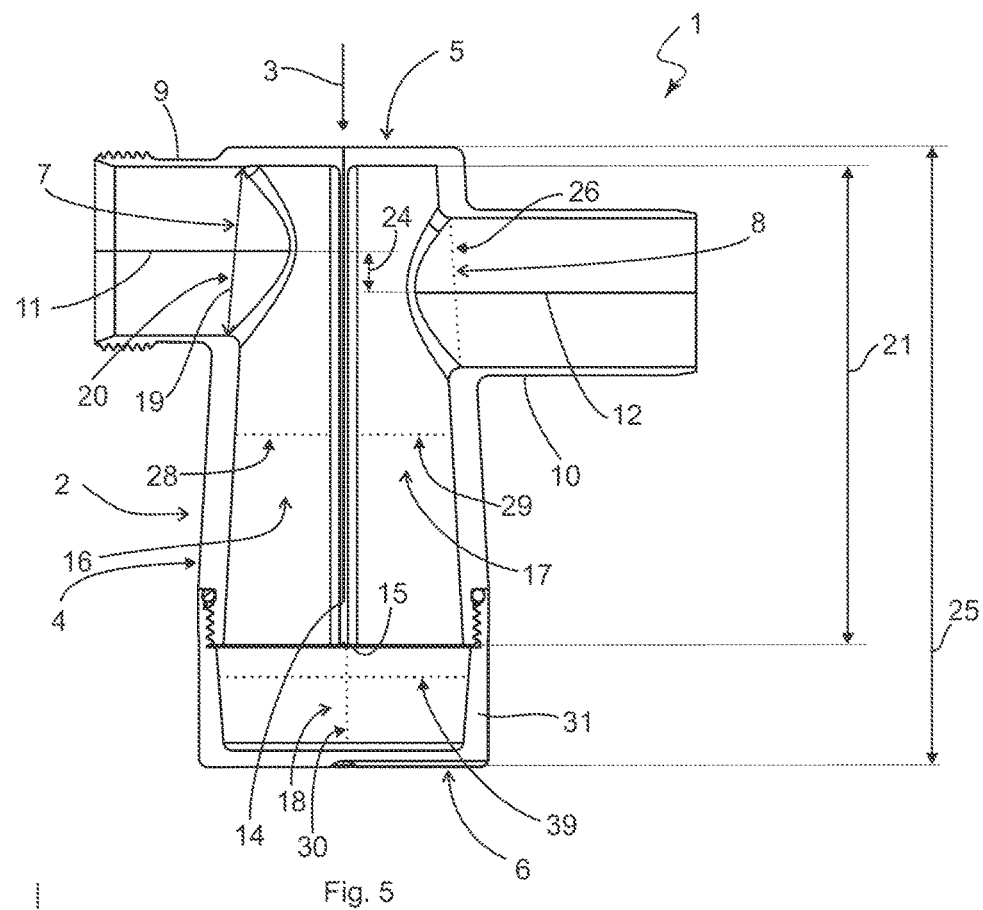
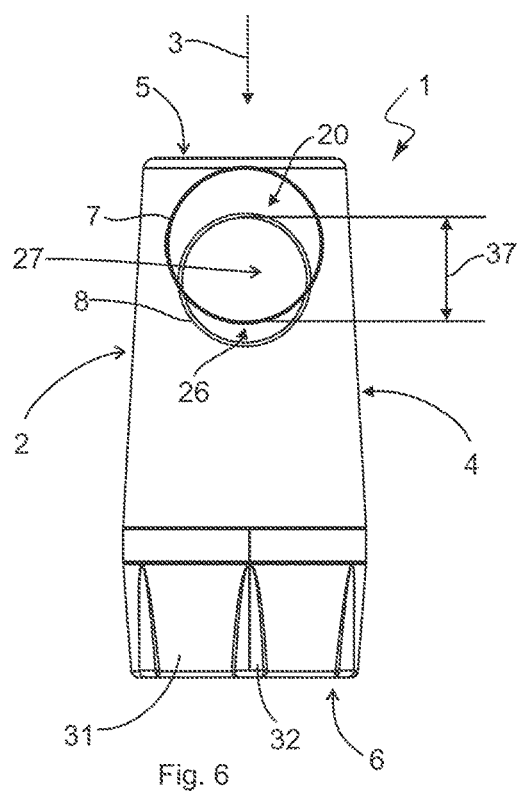
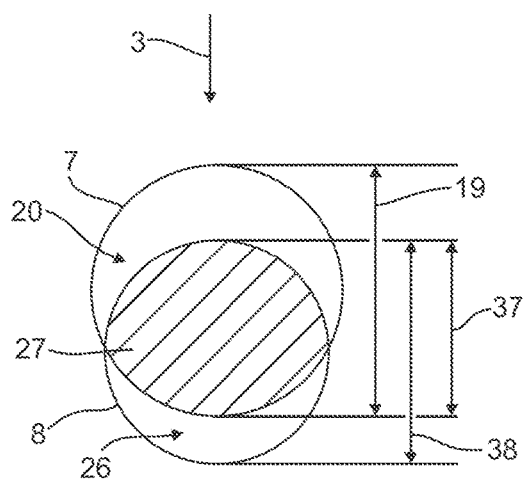

CONDENSING BOILER CONDENSATE DISCHARGE DEVICE

BACKGROUND

The invention relates to a condensing boiler condensate discharge device for removing condensate accumulating on a condensing boiler.

Modern heating appliances are usually designed as so-called condensing appliances with condensing boilers. Such condensing boilers are used to cool down the exhaust gas as far as possible and thus the condensation heat of the water vapor contained in the exhaust gas is also used to provide heat. The exhaust gas is cooled down below its condensation temperature so that the water vapor contained in the exhaust gas condenses. The condensate produced is usually collected in a so-called condensate tray and then discharged to a wastewater pipe via a corresponding condensing boiler condensate discharge device. Condensing boiler condensate discharge devices known from the prior art have a device designed in the manner of an odour trap in order to prevent uncontrolled discharge of exhaust gas via the condensing boiler condensate discharge device. These devices designed in the manner of an odour trap are oriented towards comparable devices from the sanitary sector and have, for example, a U-shaped tubular piece connected to the wastewater pipe. Such devices consist of a multitude of components, resulting in the risk of incorrect installation of the overall condensing boiler condensate discharge device and thus an unsafe blocking effect for the waste gas. Known condensing boiler condensate discharge devices are therefore usually designed to be very oversized, which disadvantageously requires a large installation space and excessive height.

The object of the invention is to create a solution that provides an improved condensing boiler condensate discharge device in a constructively simple way, by means of which the abovementioned disadvantages are avoided and a safe blocking effect for the exhaust gas is achieved.

SUMMARY

The condensing boiler condensate discharge device has a hollow body extending in a longitudinal direction, which hollow body has a peripheral wall, a first longitudinal end and a second longitudinal end. The first longitudinal end and the second longitudinal end are closed, wherein an inflow opening is designed in the peripheral wall, which inflow opening extends starting from the first longitudinal end in the direction of the second longitudinal end. A drain opening is designed in the peripheral wall, which drain opening is opposite the inflow opening. A separating wall is designed within the longitudinal hollow body, which separating wall extends from the first longitudinal end in the direction of the second longitudinal end and which has a free end. The separating wall divides the longitudinal hollow body into a condensate receiving channel, which is flow-connected to the inflow opening, and a condensate discharge channel, which is flow-connected to the drain opening. The condensate receiving channel and the condensate discharge channel are flow-connected to each other via a passage designed between the free end of the separating wall and the second longitudinal end. The drain opening and the inflow opening are arranged to be overlapping with an overlap length as viewed in the longitudinal direction of the hollow body.

The condensing boiler condensate is characterized by a simple and compact design. By virtue of the fact that the inflow opening and the drain opening opposite the inflow opening are designed in the peripheral wall of the hollow body and the inflow opening extends starting from the first longitudinal end in the direction of the second longitudinal end, condensate flows in and out laterally towards and away from the hollow body such that substantially no installation space is required above the first longitudinal end or inflow opening, and the entire longitudinal extension of the hollow body can be limited to a minimum. The required longitudinal extension of the hollow body is based on the required longitudinal extension of the separating wall. The longitudinal extension of the separating wall is responsible for the blocking function to prevent exhaust gas from escaping. This means that for a compact design with a low height, the longitudinal extension of the separating wall is oriented to the expected exhaust gas pressures and pressure fluctuations of the condensing boiler, wherein for a minimally designed height, it is provided that the drain opening and inflow opening are arranged to be overlapping with an overlap length as viewed in the longitudinal direction of the hollow body such that the inflow opening and drain opening overlap when viewed laterally. A condensing boiler condensate discharge device with a minimum height and a safe exhaust gas barrier is thus provided.

In an embodiment that the overlap length is at least 50% of a maximum length of a cross-sectional area of the inflow opening. A maximum length of a cross-sectional area is understood, for example, to be a diameter in the case of a circular cross-sectional area, the main axis in the case of an elliptical cross-sectional area, or a diagonal in the case of a square cross-sectional area.

With regard to a low height of the condensing boiler condensate discharge device, it is further advantageous if a maximum length of a cross-sectional area of the inflow opening, which as described above can be a diagonal, a main axis or a diameter, is at least 20% and at most 42% of the longitudinal extension of the separating wall.

In one embodiment, it is further envisaged that the separating wall has a longitudinal extension directed in the longitudinal direction and which is at least 2 times and at most 6 times a maximum length of a cross-sectional area of the inflow opening, which as described above can be a diagonal, a main axis or a diameter. This longitudinal extension of the separating wall is suitable for condensing boilers with a low and high nominal output in order to prevent waste gas escaping through the condensing boiler condensate discharge device.

In one embodiment the drain opening is arranged offset as viewed in the longitudinal direction and circumferentially to the inflow opening. This effectively prevents condensate flowing back into a condensate tray of the condensing boiler.

In order to securely prevent condensate flowing back in the direction of the condensing boiler, in a further embodiment a center axis of the drain opening is arranged at a distance from a center axis of the inflow opening.

In order to minimize the height and the associated installation space required for the condensing boiler condensate discharge device, it is envisaged in a further embodiment that the distance between the center axis of the inflow opening and the center axis of the drain opening is less than 12% of an overall length of the elongated hollow body considered in the longitudinal direction.

In a further embodiment, it is envisaged that a cross-sectional area of the drain opening is formed smaller than or at most equal to a cross-sectional area of the inflow opening.

In a further embodiment a maximum length of a cross-sectional area of the drain opening is the same as a maximum length of a cross-sectional area of the inflow opening. On the other hand, it can also be advantageous if a maximum length of a cross-sectional area of the drain opening is smaller than a maximum length of a cross-sectional area of the inflow opening and no more than a third smaller than the maximum length of the cross-sectional area of the inflow opening. However, it is also conceivable that a maximum length of a cross-sectional area of the drain opening is larger than a maximum length of a cross-sectional area of the inflow opening and no more than a third larger than the maximum length of the cross-sectional area of the inflow opening. These last three mentioned special embodiments provided a circular cross-sectional area as the cross-sectional area such that the maximum length in this case corresponds to an inside diameter both of the inflow opening and of the drain opening. In other words, these special embodiments envisage that the inside diameter of the drain opening is the same size as the inside diameter of the inflow opening, or that the inside diameter or the drain opening is larger than the inside diameter of the inflow opening and no more than a third larger than the inside diameter of the inflow opening, or that the inside diameter of the drain opening is smaller than the inside diameter of the inflow opening and no more than a third smaller than the inside diameter of the inflow opening.

Furthermore, with regards to minimizing the height of the condensing boiler condensate discharge device, it is advantageous if with reference to a side view of the hollow body, a cross-sectional area of the inflow opening and a cross-sectional area of the drain opening form an overlap area.

In this regard, in a further embodiment with reference to a side view of the hollow body, the cross-sectional area of the inflow opening and the cross-sectional area of the drain opening are arranged to overlap by at least 35%.

In view of a cheap manufacturing process, in another embodiment a center axis of the inflow opening and a center axis of the drain opening are arranged facing in a same spatial direction.

In order to produce the hollow body inexpensively in an established deep drawing process, in one embodiment the hollow body is conical as viewed in a longitudinal direction.

In order to ensure a smooth and unrestricted discharge of the condensate, in one embodiment a cross-sectional area of the condensate receiving channel and/or a cross-sectional area of the condensate discharge channel is at least 50% or at most equal to the cross-sectional area of the inflow opening.

Likewise, for reasons of a smooth and unrestricted condensate discharge, it is envisaged in one embodiment a cross-sectional area of the passage is at least 40% of a clear cross-sectional area extending transversely to the cross-sectional area of the passage and located between the free end of the partition and the second longitudinal end.

For maintenance purposes, it is further particularly advantageous if in one embodiment the second longitudinal end of the hollow body is formed by a closure cap detachably attachable to the hollow body.

A compact design of the condensing boiler condensate removal device with a closure cap is provided in one embodiment by virtue of the fact that the closure cap is pot-shaped and forms the passage which flow-connects the condensate receiving channel and the condensate discharge channel.

In order to see whether the inside of the hollow body is dirty and needs cleaning without disassembling the closure cap, in one advantageous embodiment the closure cap is at least partially made of a transparent material.

In order, for example, for the closure cap to be loosened from or attached to the hollow body via a threaded connection even without tools, in one embodiment the closure cap is formed on the outside with indentations and/or protrusions. The fingers of a user will then find enough resistance on the indentations and/or protrusions in order to loosen the closure cap from the hollow body or attach it to the hollow body.

Finally, it is envisaged for an alternative embodiment of the condensing boiler condensate discharge device that the hollow body has a first partial body and a second partial body, wherein the inflow opening, the drain opening and a first partial separating wall are formed on the first partial body, and the first partial body has the first longitudinal end, wherein the second longitudinal end and a second partial separating wall are formed on the second partial body, wherein the first partial separating wall and the second partial separating wall form the separating wall and wherein the first partial body and the second partial body are releasably connected to one another in a sealing manner.

It is understood that the features mentioned above and to be explained below can be used not only in the combination indicated in each case, but also in other combinations or on their own, without departing from the scope of the present invention. The scope of the invention is only defined by the claims.

Further details, features and advantages of the object of the invention result from the following description in connection with the drawing, in which exemplary and preferred exemplary embodiments of the invention are represented.

BRIEF DESCRIPTION OF THE DRAWINGS

FIG. 5 shows a sectional view of the condensing boiler condensate discharge device, FIG. 6 shows a side and partially transparent view of the condensing boiler condensate discharge device, FIG. 7 shows a schematic illustration of an inflow opening and a drain opening of the hollow body and FIG. 8 shows a sectional view of an alternative embodiment of a condensing boiler condensate discharge device according to the invention.

DETAILED DESCRIPTION

Figure 1:
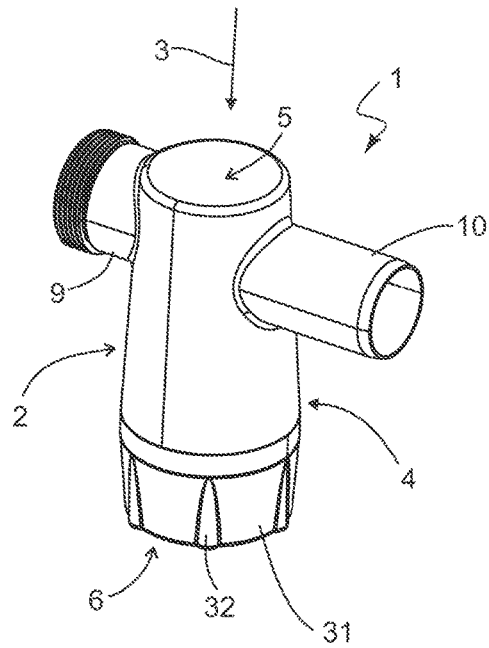
FIG. 1 shows a perspective view of a condensing boiler condensate discharge device according to the invention.
Figure 8:
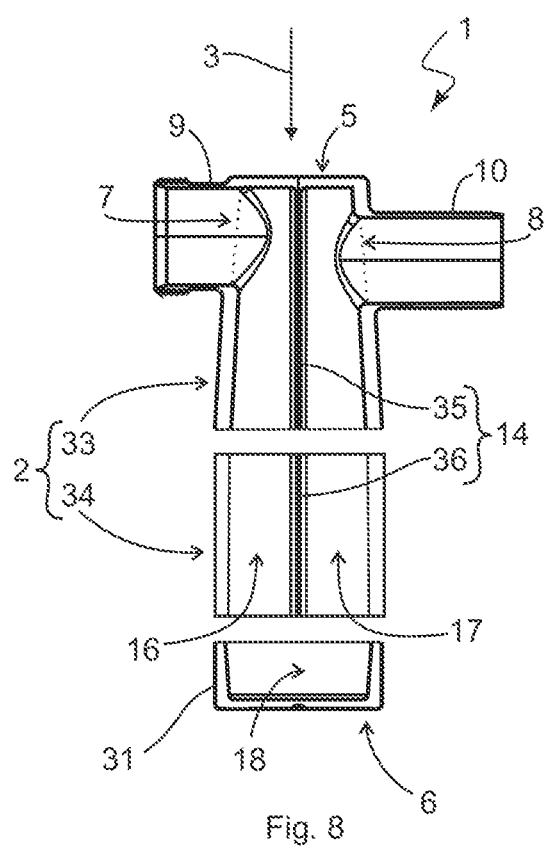

FIG. 1 shows a perspective view of a condensing boiler condensate discharge device 1, wherein FIGS. 1 to 7 show various illustrations of a first embodiment of the condensing boiler condensate discharge device 1, whereas FIG. 8 shows an alternative embodiment of the condensing boiler condensate discharge device 1.

As can be seen in FIGS. 1 to 7, the condensing boiler condensate discharge device 1 has a hollow body 2, which extends in a longitudinal direction 3. The hollow body 2 has a peripheral wall 4, which extends from a first longitudinal end 5 of the hollow body 2 to a second longitudinal end 6 of the hollow body 2. In the exemplary embodiment shown in the figures, the hollow body 2 is conical in the longitudinal direction 3, wherein a cylindrical design as viewed in cross-section is also alternatively conceivable. As can further be seen from FIGS. 1, 5 and 6, for example, the hollow body 2 is closed at its first longitudinal end 5 and at its second longitudinal end 6. An inflow opening 7 and a drain opening 8 are formed in the peripheral wall 4 of the hollow body 2 of the condensing boiler condensate discharge device 1 for the purpose of removing condensate, as can be seen, for example, in the sectional views in FIGS. 4 and 5. An inflow nozzle 9, which can be connected to a condensate tray of the condensing boiler, for example, extends from the inflow opening 7, wherein the inflow nozzle 9 is provided with an external thread for this purpose in the illustrated embodiment. Furthermore, a drain nozzle 10, which can be connected to a wastewater pipe, extends from the drain opening 8 in order to drain off condensate that accumulates and needs to be removed. The inflow nozzle 9 and the drain nozzle 10 respectively extend substantially perpendicular to the longitudinal direction 3 of the longitudinal hollow body 2 such that, as a consequence, the inflow nozzle 9 and the drain nozzle 10 point in a same spatial direction. It is, however, also conceivable that the inflow nozzle 9 and/or the drain nozzle 10 is/are designed to run slightly inclined in the direction of the second longitudinal end 6. FIG. 5, however, clearly shows what is essential for the embodiment shown, namely that a center axis 11 of the inflow opening 7 and a center axis 12 of the drain opening 8 are arranged facing in a same spatial direction, wherein the spatial direction runs transversely or to the longitudinal direction 3.

Figure 3:
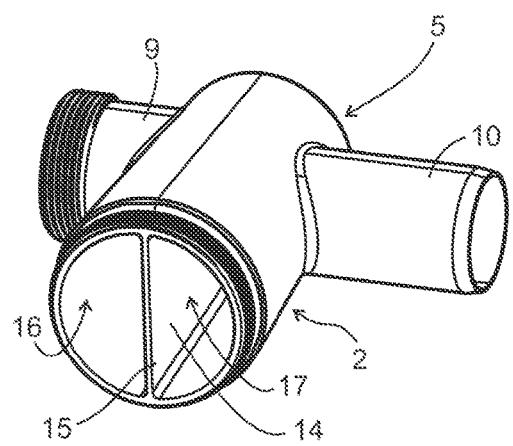
FIG. 3 shows a perspective bottom view of the hollow body shown in FIG. 2.
Figure 4:
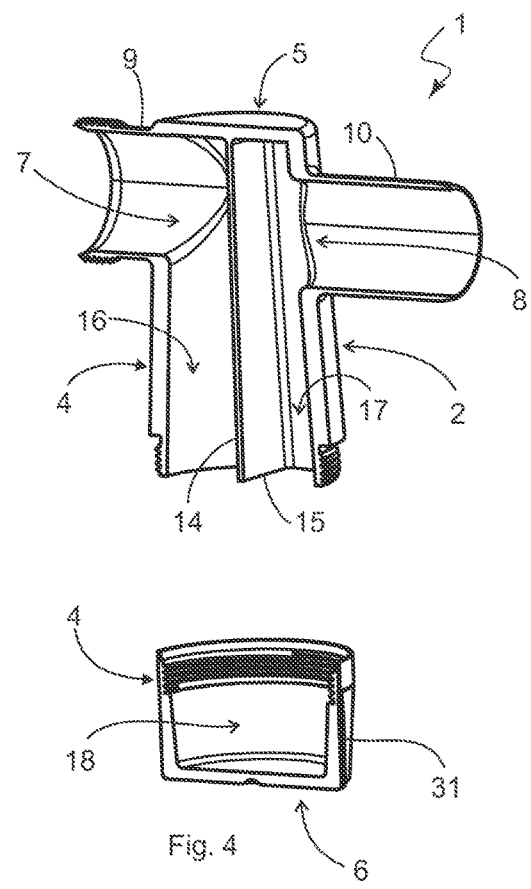
FIG. 4 shows a perspective sectional view of the hollow body and the dismantled closure cap.

As can further be seen in FIGS. 4 and 5, for example, the inflow opening 7 is formed laterally on the first longitudinal end 5. In this case, the cross section or a cross-sectional area 20 of the inflow opening 7 extends starting at the first longitudinal end 5 in the direction of the second longitudinal end 6, wherein the drain opening 8 is arranged opposite the inflow opening 7. An opposite arrangement of the inflow opening 7 and drain opening 8 is not absolutely necessary. However, a circumferential offset of the inflow opening 7 and drain opening 8 is required due to a separating wall 14 separating the inflow opening 7 and the drain opening 8 in terms of flow. It can be seen in FIG. 3 and the sectional views of FIGS. 4 and 5 that the separating wall 14 is formed within the longitudinal hollow body 2. The separating wall 14 extends from the first longitudinal end 5 in the direction of the second longitudinal end 6 and has a free end 15 (see for example FIGS. 3, 4 and 5). The separating wall 14 thus divides the hollow body 2 in sections into two sub-sections, which in the embodiment shown in the drawings are equally subdivided, as a result of which the two sub-sections have a semicircular cross section. An unequal division of the hollow body 2 by the separating wall 14 is also conceivable, of course. The free end 15 is arranged here between the first longitudinal end 5 and the second longitudinal end 6, wherein the separating wall 14 divides the longitudinal hollow body 2 into a condensate receiving channel 16 and a condensate discharge channel 17. As can be seen in FIG. 3, the equal division of the hollow body 2 as mentioned above leads to the condensate receiving channel 16 and the condensate discharge channel 17 being semicircular in cross section, wherein another cross-sectional shape and/or unsymmetrical or unequal division of the hollow body 2 by the separating wall 14 is also conceivable. The condensate receiving channel 16 is flow-connected to the inflow opening 7 such that condensate can flow from the condensate tray of the condensing boiler via the inflow nozzle 9 and the inflow opening 7 into the condensate receiving channel 16. The condensate receiving channel 16 and the condensate discharge channel 17 are flow-connected to each other via a passage 18 designed between the free end 15 of the separating wall 14 and the second longitudinal end 6. Furthermore, the condensate discharge channel 17 is connected to the wastewater pipe via the drain opening 8 and drain nozzle 10 such that condensate can be removed from the condensing boiler condensate discharge device 1.

The small height of the condensing boiler condensate discharge device 1 is achieved, on the one hand, by the arrangement of the inflow opening 7 and the inflow nozzle 9 extending perpendicularly from the peripheral wall 4 of the hollow body 2, but also by the arrangement of the drain opening 8 and the drain nozzle 10 extending perpendicularly from the peripheral wall of the hollow body 2. On the other hand, the small height is achieved by the fact that the separating wall 14 is not of any length in the longitudinal direction 3 and in the direction of the second longitudinal end 6. Rather, a longitudinal extension 21 of the separating wall 14 in the longitudinal direction 3 is oriented to conceivable pressure fluctuations of the waste gas of the condensing boiler and the size of the inflow opening 7 to prevent waste gas escaping via the condensing boiler condensate discharge device 1. It has proven advantageous here that a maximum length 19 of the cross-sectional area 20 of the inflow opening 7 is at least 20% and no more than 42% of a longitudinal extension 21 of the separating wall 14 directed in the longitudinal direction 3. The maximum length 19 of the cross-sectional area 20 is, for example, a diameter in the case of a circular cross-sectional area, as in the case of the embodiment shown. Alternatively, the maximum length 19 is understood to be a diagonal in the case of a square cross-sectional area, wherein further the maximum length is the main axis in the case of an elliptical cross-sectional area. As the exemplary embodiment is a circular cross-sectional area 20, the separating wall 14 thus has a longitudinal extension 21 directed in the longitudinal direction 3 and which is at least twice and no more than 6 times the diameter 19, i.e. the maximum length of the cross-sectional area 20 of the inflow opening 7.

As can further be seen from the figures, the drain opening 8 is arranged offset in the longitudinal direction 3 to the inflow opening 7, which not only involves a circumferential offset, but in particular an offset in the longitudinal direction 3. The offset arrangement becomes particularly clear by looking at the center axes 11 and 12 of the inflow opening 7 and drain opening 8. A distance 24 (see for example FIG. 5) between the center axis 11 of the inflow opening 7 and the center axis 12 of the drain opening 8 is less than 12% of an overall length 25 of the longitudinal hollow body 2 as viewed in the longitudinal direction 3. Offsetting the drain opening 8 to the inflow opening 7 is, however, not absolutely necessary as an arrangement of the drain opening 8 to the inflow opening 7 is also conceivable in which the drain opening 8 is arranged at the same height as the inflow opening 7. However, it is important in terms of a small height that the inflow opening 7 and drain opening 8 overlap to a certain extent. This means that when viewed in the longitudinal direction 3 of the hollow body 2, the drain opening 8 and inflow opening 7 are arranged to be overlapping with an overlap length 37 (see for example FIGS. 6 and 7), which can be seen in particular by the side view of the hollow body 2 in FIG. 6, which shows a partially transparent illustration, in which the cross-sectional area 20 of the inflow opening 7 and a cross-sectional area 26 of the drain opening 8 form an overlap area 27 and the overlap length 37, as is also shown schematically in FIG. 7 for both cross-sectional areas 20 and 26. It has proved to be particularly advantageous here if with reference to a side view of the hollow body 2, the cross-sectional area 20 of the inflow opening 7 and the cross-sectional area 26 of the drain opening 8 are arranged to overlap by at least 35%. The overlap length 37 is at least 50% of the maximum length or of the diameter 19 of the cross-sectional area 20 of the inflow opening 7. FIG. 7 also shows a maximum length 38 of the cross-sectional area 26 of the drain opening 8, wherein this maximum length 38 is the diameter of the cross-sectional area 26. It should be noted that the inflow opening 7 and drain opening 8 can have identical diameters or maximum lengths 19 and 38. The diameters or maximum lengths 19 and 38 can, however, also be different to one another. By way of example, the maximum length in the case of a circular cross-sectional area 20 or 26 corresponds to an inside diameter of the inflow opening 7 or drain opening 8. In this case, the maximum length 38 of the cross-sectional area 26 of the drain opening 8, i.e. the inside diameter 38 of the drain opening 8, can be the same as the maximum length 19 of the cross-sectional area 20 of the inflow opening 7, i.e. the inside diameter 19 of the inflow opening 7. Alternatively, it is also conceivable that the maximum length 38 of the cross-sectional area 26 of the drain opening 8 is smaller than the maximum length 19 of the cross-sectional area 20 of the inflow opening 7 and no more than a third smaller than the maximum length 19 of the cross-sectional area 20 of the inflow opening 7. On the other hand, the maximum length 38 of the cross-sectional area 26 of the drain opening 8 can also be larger than the maximum length 19 of the cross-sectional area 20 of the inflow opening 7 and no more than a third larger than the maximum length 19 of the cross-sectional area 20 of the inflow opening 7.

For a uniform and unrestricted condensate discharge via the condensing boiler condensate discharge device 1, it is provided in the exemplary embodiment shown in the figures that the various cross-sectional areas have a certain minimum and do not exceed a certain maximum with the hollow body 2 of the condensing boiler condensate discharge device 1. For this purpose, it is envisaged that a cross-sectional area 28 of the condensate receiving channel 16 corresponds to at least 50% of the cross-sectional area 20 of the inflow opening 7, wherein the cross-sectional area 28 of the condensate receiving channel 16 corresponds at most to the size of the cross-sectional area 20 of the inflow opening 7. Likewise, a cross-sectional area 29 of the condensate discharge channel 17 is intended to be at least 50% of the cross-sectional area 20 of the inflow opening 7, wherein the cross-sectional area 29 of the condensate discharge channel 17 is intended to correspond at most to the size of the cross-sectional area 20 of the inflow opening 7. In addition, a cross-sectional area 30 of the passage 18, which extends between the second longitudinal end 6 and the free end 15 of the separating wall 14, is intended to be at least 40% of a clear cross-sectional area 39 (see FIG. 5), wherein the clear cross-sectional area 39 extends transversely to the cross-sectional area 30 of the passage 18 and the clear cross-sectional area 39 is arranged between the free end 15 of the separating wall 14 and the second longitudinal end 6. In the exemplary embodiment shown in the figures, the illustrated cross-sectional areas correspond to the above-specified ratios and ensure uniform discharge of condensate.

Figure 2:
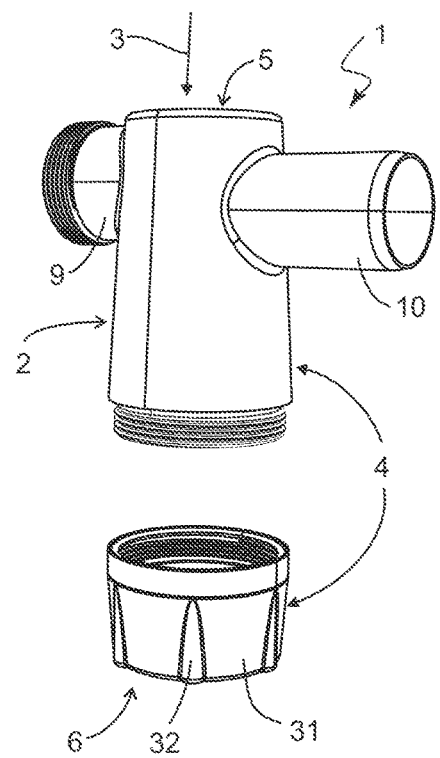
FIG. 2 shows a perspective view of the condensing boiler condensate discharge device shown in FIG. 1, in which a closure cap is dismantled from a hollow body.

In the exemplary embodiment illustrated in the figures, the second longitudinal end 6 of the hollow body 2 is formed by a closure cap 31. In this case, the closure cap 31 is releasably attached to the hollow body 2 via a threaded connection and can be released from the hollow body 2 for maintenance purposes or to clean the hollow body 2. As can be seen in FIGS. 2, 4 and 5, the closure cap 31 is pot-shaped and provided with an internal thread, which can be engaged with an external thread formed on the hollow body 2 in order to mount the closure cap 31 on the hollow body 2. In this case, the hollow inside of the cap 31 forms the passage 18 such that the separating wall 14 extends over the entire length of the hollow body 2, as can also be seen in FIG. 3. However, the closure cap 31 forms a section of the peripheral wall 4, wherein the remaining section of the peripheral wall 4 is formed by the hollow body 2. The closure cap 31 also forms at least one section of the passage 18, which connects the condensate receiving channel 16 and the condensate discharge channel 17 to one another in terms of flow. As can be seen in FIG. 5, for example, the separating wall 14 extends to the end of the hollow body 2, which faces away from the first longitudinal end 5 and which is releasably connected to the cap 31. In the exemplary embodiment shown in FIG. 5, the free end 15 of the separating wall 14 finishes flush with the end of the hollow body 2, which faces away from the first longitudinal end 5. In order to facilitate assembly and protect against damage to the separating wall 14 during assembly of the hollow body 2 and closure cap 31, the separating wall 14 should not extend into the closure cap 31. In order to better assess whether the hollow body 2 of the condensing boiler condensate discharge device 1 needs cleaning, the closure cap 31 is formed at least in sections by a transparent material such that a visual inspection of the level of dirt can be carried out at any time without disassembling the closure cap 31. The closure cap 31 can both be disassembled from the hollow body 2 and mounted on the hollow body 2 without the aid of a tool. For this purpose, the closure cap 31 has several protrusions 32 formed around the circumference of the closure cap 31, which protrusions 32 are used for manual handling of the closure cap 31 by a user. It is also conceivable that in addition to the protrusions, a plurality of indentations are provided around the circumference of the closure cap 31.

Finally, an alternative embodiment is shown in FIG. 8. This alternative embodiment differs from the embodiment shown in FIGS. 1 to 7 only in that the hollow body 2 is now no longer formed in one piece, but consists of several parts. All of the abovementioned features for the embodiment shown in FIGS. 1 to 7 also continue to apply to the embodiment shown in FIG. 8. According to the alternative embodiment shown in FIG. 8, the hollow body 2 has a first partial body 33 and a second partial body 34. In this case, the inflow opening 7, the drain opening 8 and a first partial separating wall 35 are formed on the first partial body 33, wherein the first partial body 33 further has the first longitudinal end 5. In contrast, the second longitudinal end 6 and a second partial separating wall 36 are formed on the second partial body 34. The first partial separating wall 35 and the second partial separating wall 36 form the separating wall 14, wherein the first partial body 33 and the second partial body 34 are releasably connected to one another in a sealing manner. As can further be seen in FIG. 8, the second partial body 34 is arranged between the first partial body 33 and the closure cap 31, wherein the closure cap 31 forms the second longitudinal end 6 such that the closure cap 31 is part of the second partial body 34 in the embodiment shown in FIG. 8 and the second partial body 34 is thus designed in two parts. However, in a modification of the embodiment shown in FIG. 8, a design is also conceivable in which no releasably attached closure cap 31 is provided, but rather the second partial body 34 and the closure cap 31 are designed in one piece such that the hollow body 2 cannot be opened at its second longitudinal end 6.

The described invention is, of course, not limited to the embodiments described and illustrated. It can be seen that numerous modifications obvious to a person skilled in the art in accordance with the intended application can be undertaken to the embodiments illustrated in the drawing without thereby departing from the scope of the invention. The invention includes everything that is included in the description and/or illustrated in the drawing, including that which is obvious to a person skilled in the art deviating from the specific exemplary embodiments.

The invention claimed is:

1. A condensing boiler condensate discharge device, comprising a hollow body extending in a longitudinal direction, said hollow body has a peripheral wall, a first longitudinal end and a second longitudinal end,
wherein the first longitudinal end and the second longitudinal end are closed and an inflow opening is provided in the peripheral wall, the inflow opening extends from the first longitudinal end toward of the second longitudinal end,
wherein a drain opening is provided in the peripheral wall, the drain opening is opposite the inflow opening,
wherein a separating wall is designed within the hollow body, the separating wall extends from the first longitudinal end toward of the second longitudinal end and the separating wall has a free end,
wherein the separating wall divides the hollow body into a condensate receiving channel, which is fluidly connected to the inflow opening, and a condensate discharge channel, which is fluidly connected to the drain opening,
wherein the condensate receiving channel and the condensate discharge channel are fluidly connected to each other via a passage provided between the free end of the separating wall and the second longitudinal end,
wherein the drain opening and the inflow opening are arranged to be overlapping with an overlap length as viewed in the longitudinal direction of the hollow body, and
wherein the drain opening is arranged offset in the longitudinal direction and circumferentially to the inflow opening.

2. The condensing boiler condensate discharge device according to claim 1, wherein the overlap length is at least 50% of a maximum length of a cross-sectional area of the inflow opening.

3. The condensing boiler condensate discharge device according to claim 1, wherein a maximum length of a cross-sectional area of the inflow opening is at least 20% and at most 42% of a longitudinal length of the separating wall directed in the longitudinal direction.

4. The condensing boiler condensate discharge device according to claim 1, wherein the separating wall has a longitudinal length directed in the longitudinal direction, which is at least 2 times and at most 6 times a maximum length of the inflow opening.

5. The condensing boiler condensate discharge device according to claim 1, wherein a center axis of the drain opening is arranged at a distance from a center axis of the inflow opening.

6. The condensing boiler condensate discharge device according to claim 5, wherein the distance between the center axis of the drain opening and the center axis of the inflow opening is less than 12% of an overall length of the hollow body in the longitudinal direction.

7. The condensing boiler condensate discharge device according to claim 1, wherein a cross-sectional area of the drain opening is formed smaller than or at most equal to a cross-sectional area of the inflow opening.

8. The condensing boiler condensate discharge device according to claim 1, wherein a maximum length of a cross-sectional area of the drain opening is formed smaller than a maximum length of a cross-sectional area of the inflow opening and smaller by at most one third than the maximum length of the cross-sectional area of the inflow opening.

9. The condensing boiler condensate discharge device according to claim 1, wherein a maximum length of a cross-sectional area of the drain opening is larger than a maximum length of a cross-sectional area of the inflow opening and at most one third larger than the maximum length of the cross-sectional area of the inflow opening.

10. The condensing boiler condensate discharge device according to claim 1, wherein with reference to a side view of the hollow body, a cross-sectional area of the inflow opening and a cross-sectional area of the drain opening form an overlap area.

11. The condensing boiler condensate discharge device according to claim 10, wherein with reference to the side view of the hollow body, the cross-sectional area of the inflow opening and the cross-sectional area of the drain opening are arranged to overlap by at least 35% of the cross-sectional area of the drain opening.

12. The condensing boiler condensate discharge device according to claim 1, wherein a center axis of the inflow opening and a center axis of the drain opening are arranged to extend in a same spatial direction.

13. The condensing boiler condensate discharge device according to claim 1, wherein the hollow body is conical in the longitudinal direction.

14. The condensing boiler condensate discharge device according to claim 1, wherein a cross-sectional area of the condensate receiving channel and/or a cross-sectional area of the condensate discharge channel is at least 50% of or at most equal to a cross-sectional area of the inflow opening.

15. The condensing boiler condensate discharge device according to claim 1, wherein a cross-sectional area of the passage is at least 40% of a clear cross-sectional area extending transversely to the cross-sectional area of the passage and located between the free end of the partition and the second longitudinal end.

16. The condensing boiler condensate discharge device according to claim 1, wherein the second longitudinal end of the hollow body is formed by a closure cap detachably attached to the hollow body.

17. The condensing boiler condensate discharge device according to claim 16, wherein the closure cap is pot-shaped and forms the passage which fluidly connects the condensate receiving channel and the condensate discharge channel.

18. The condensing boiler condensate discharge device according to claim 16, wherein the closure cap is at least partially made of a transparent material.

19. The condensing boiler condensate discharge device according to claim 16, wherein indentations or protrusions are formed on the outer surface of the closure cap.

20. The condensing boiler condensate discharge device according to claim 1, wherein the hollow body has a first partial body and a second partial body, wherein the inflow opening, the drain opening and a first partial separating wall are formed on the first partial body, and the first partial body has the first longitudinal end, wherein the second longitudinal end and a second partial separating wall are formed on the second partial body, wherein the first partial separating wall and the second partial separating wall form the separating wall and wherein the first partial body and the second partial body are releasably connected to one another in a sealing manner.

\* \* \* \* \*